US007135991B2

(12) United States Patent
Slemmer et al.

(10) Patent No.: US 7,135,991 B2
(45) Date of Patent: Nov. 14, 2006

(54) AUTOMATED PARKING DIRECTOR SYSTEMS AND RELATED METHODS

(75) Inventors: John Blake Slemmer, Norcross, GA (US); Neil Fredrick Rivenburgh, Lawrenceville, GA (US)

(73) Assignee: BellSouth Intellectual Property, Wilmington, DE (US)

( * ) Notice: Subject to any disclaimer, the term of this patent is extended or adjusted under 35 U.S.C. 154(b) by 0 days.

(21) Appl. No.: 11/372,584

(22) Filed: Mar. 10, 2006

(65) Prior Publication Data

US 2006/0170566 A1 Aug. 3, 2006

Related U.S. Application Data

(63) Continuation of application No. 10/457,909, filed on Jun. 10, 2003, now Pat. No. 7,026,954.

(51) Int. Cl.
*B60Q 1/48* (2006.01)
*G08G 1/14* (2006.01)

(52) U.S. Cl. ...................... 340/932.2; 340/905; 705/13

(58) Field of Classification Search ............ 340/932.2, 340/905; 705/13
See application file for complete search history.

(56) References Cited

U.S. PATENT DOCUMENTS 5,091,727 A 2/1992 Mahmood ................ 340/932.2
5,432,508 A 7/1995 Jackson ................... 340/932.2
5,504,314 A 4/1996 Farmont ..................... 235/384
5,748,107 A * 5/1998 Kersken et al. ............. 340/905
5,910,782 A 6/1999 Schmitt et al. ........ 340/995.12
6,147,624 A 11/2000 Clapper ................... 340/932.2
6,340,935 B1 1/2002 Hall ........................ 340/932.2
6,501,391 B1 12/2002 Racunas, Jr. ............. 340/932.2
6,650,250 B1 11/2003 Muraki .................... 340/932.2
6,771,185 B1 8/2004 Yoo et al. ................ 340/932.2
6,816,085 B1 * 11/2004 Haynes et al. ........... 340/932.2
2005/0033634 A1 * 2/2005 Pugliese, III ................ 705/13

OTHER PUBLICATIONS

*ABB introduces world's first wireless proximity sensor*, Control Engineering, 1 sheet, www.manufacturing.net/ctl/index.asp?layout=articleWebzine&articleid=CA219943, (May 15, 2002).

*MICA, The Commercialization of Microsensor Motes*, Sensor Technology and Design, 8 sheets, www.sensorsmag.com/articles/0402/40/main.shtml, (Apr. 2002).

*Custom-Developed Communications System for Sandton City's Intelligent Parking Garage*, Q-Kon (Pty) Ltd., 2 sheets, date unknown but prior to Apr. 2003.

(Continued)

*Primary Examiner*—Jeffery Hofsass
*Assistant Examiner*—Samuel J. Walk
(74) *Attorney, Agent, or Firm*—Myers Bigel Sibley & Sajovec PA

(57) ABSTRACT

Systems and methods of directing parking in a parking lot include: (a) detecting the presence and/or absence of a vehicle in respective parking spaces in a parking lot having a plurality of parking spaces to monitor the availability of parking spaces; (b) identifying the space location of parking spaces that are available for use based on the detecting and monitoring steps; (c) automatically providing the location of the identified available spaces to prospective users in substantially real-time; and (d) electronically correlating a parking space to a user to allow a parking space to be identified if a patron forgets where he/she parked.

20 Claims, 8 Drawing Sheets

OTHER PUBLICATIONS

Ran, B. et al., *Intelligent Parking Garages*, UW-Madison Transportation Society, 1 sheet www.cae.wisc.edu/~uwits/education/programs/garages.html, date unknown but prior to Apr. 2003.

Ifm efector, Position Sensors, 1 sheet, www.ifmefector.com/ifmus/web/position.htm, date unknown but prior to Apr. 2003.

TransCore, *Amtech Division of Intermec and Central Dallas Association Expand Automated Parking Program*, 3 sheets, www.amtech.com/news/news981005.htm, (Oct. 5, 1998).

SICK Products, *Capacitive proximity sensors*, 1 sheet, www.sick.de/de/products/categories/industrial/capacitiveproximity/en.html, date unknown but prior to Apr. 2003.

SICK Products, *Through-Beam Photoelectric Switches*, 2 sheets, www.sick.de/de/products/categories/industrial/throughbeamswitches/en.html, date unknown but prior to Apr. 2003.

SICK Products, *Inductive proximity sensors*, 1 sheet, www.sick.de/de/products/categories/industrial/induktive/en.html, date unknown but prior to Apr. 2003.

SICK Products, *Ultrasonic sensors*, 1 sheet, www.sick.de/de/products/categories/industrial/ultrasonic/en.html, date unknown but prior to Apr. 2003.

SICK Products, *Magnetic proximity sensors*, 1 sheet, www.sick.de/de/products/categories/industrial/magneticproximity/en.html, date unknown but prior to Apr. 2003.

SICK Products, *The four Detection Principles*, 1 sheet, www.sick.de/de/products/categories/industrial/reflexswitches1/en.html, date unknown but prior to Apr. 2003.

SICK Products, *Photoelectric Reflex Switches*, 2 sheets, www.sick.de/de/products/categories/industrial/reflexswitches0/en.html, date unknown but prior to Apr. 2003.

SICK Products, *Photoelectric Switches with Fibre-Optic Cables*, 1 sheet, www.sick.de/de/products/categories/industrial/photoelectircswitchwithfibreopticable/en.html, date unknown but prior to Apr. 2003.

SICK Products, *P/E Proximity Switches for Roller Conveyors*, 1 sheet, www.sick.de/de/products/categories/industrial/peproximityswitchesforrollerconveyors/en.html, date unknown but prior to Apr. 2003.

SICK Products, *Contrast Scanners*, 1 sheet, www.sick.de/de/products/categories/industrial/contrastscanners/en.html, date unknown but prior to Apr. 2003.

SICK Products, *Automation Light Grids*, 1 sheet, www.sick.de/de/products/categories/industrial/reflexlightgrids/en.html, date unknown but prior to Apr. 2003.

* cited by examiner

AUTOMATED PARKING DIRECTOR SYSTEMS AND RELATED METHODS

RELATED APPLICATIONS

This application is a continuation of U.S. patent Ser. No. 10/457,909, filed Jun. 10, 2003 now U.S. Pat. No. 7,026,954, the contents of which are hereby incorporated by reference as if recited in full herein.

FIELD OF THE INVENTION

This invention relates to intelligent parking lot systems and methods of operating same.

BACKGROUND OF THE INVENTION

Parking in parking lots and garages at public events, airports, stadiums, commuter lots, office buildings or other large parking areas can be problematic and time-consuming because it can be difficult to identify where available parking spaces are located, particularly in lots that are partially filled or almost filled to capacity.

In the past, certain parking lots manually counted the open spaces periodically to update a lot display board or sign that can indicate "full" or "spaces available." Other systems have counted the number of cars entering and leaving to provide an estimate of spaces available. This count data is used to update aggregate estimates of spaces available on the lot display board. The display boards have been placed at various positions about the parking lot, such as at each parking level in a multi-tier garage or at different access roads about the parking lot.

Unfortunately, often parking lots can be identified as "full" even when spaces are available because they may not offer "real-time" status that can identify where open spaces are located.

SUMMARY OF THE INVENTION

Some embodiments of the present invention provide intelligent parking lot systems that can provide space-specific location data to potential users to facilitate efficient utilization of parking lots. The data can be generated in substantially real-time at the entrance to the parking garage and/or at various selected locations proximate thereto. The system can include at least one object (vehicle) detector for each parking space and can operate in a wired or wireless configuration or combinations thereof.

Certain embodiments of the present invention are directed to an intelligent parking system for a parking lot comprising a plurality of individual parking spaces. The system includes: (a) at least one object detector capable of monitoring each parking space, the object sensor configured to identify when an object occupies a respective parking space and/or when the parking space is unoccupied; and (b) at least one processor in communication with the at least one detector, the at least one processor being configured to automatically identify the location of spaces that are available and/or the spaces that are unavailable based on data obtained from the at least one object detector.

Other embodiments are directed to a method of directing parking in a parking lot. The method includes: (a) detecting the presence and/or absence of a vehicle in a respective parking space in a parking lot having a plurality of parking spaces thereby monitoring the availability of parking spaces; (b) identifying the space location of parking spaces that are available for use based on the detecting and monitoring; and (c) automatically providing the location of the identified available spaces to at least one output device in substantially real-time.

Still other embodiments are directed to a system of directing parking in a parking lot that include: (a) means for detecting the presence and/or absence of a vehicle in a respective parking space in a parking lot having a plurality of parking spaces to thereby monitor the availability of parking spaces; (b) means for identifying the space location of parking spaces that are available for use; and (c) means for automatically updating and presenting the location of the identified available spaces to at least one output device accessible by a prospective parking lot customer in substantially real-time.

In particular embodiments, the parking space-location identifier data revealing available spaces can be transmitted to drivers desiring a parking space before they arrive at the parking lot, as they enter, and/or as they cruise the lot, using an external fixed display and/or a pervasive computing or mobile communication device, such as a wireless communication device, a laptop computer, a PDA, a palm pilot or other device such as those that may be integrated in the vehicle itself. In certain embodiments, the available parking spaces can be provided in a map grid display for visual graphic presentation of open or available spaces and/or as a textual summary of one or more available spaces.

In particular embodiments, the map or grid of available spaces may be relayed to a computer network such as to a web page on an internet site that can be accessed by users on individual communication devices and/or relayed to desired regional or localized driver-visible display panels positioned at desired regions about the parking lot or on access roads proximate thereto. The map can be updated in substantially real time so that a user can visually identify open or available spaces as he/she approaches the lot, enters the lot, and/or as he/she cruises through the lot when in route to a parking space.

In other embodiments, the space specific data can be generated over a conventional radio in the vehicle. The available space location data can be provided using an automated voice translation system that converts digital space data to a verbal message that can be transmitted over predetermined radiochannel(s) thereby directing the driver of a vehicle to a lot and/or open space as they arrive in the vicinity of the parking lot.

The system can also be configured to exclude parking spaces from the spaces identified as available for those spaces that are under repair or blocked from available parking (such as for safety reasons) as being unavailable even though an object may not be positioned/parked therein.

DETAILED DESCRIPTION

Figure 1:
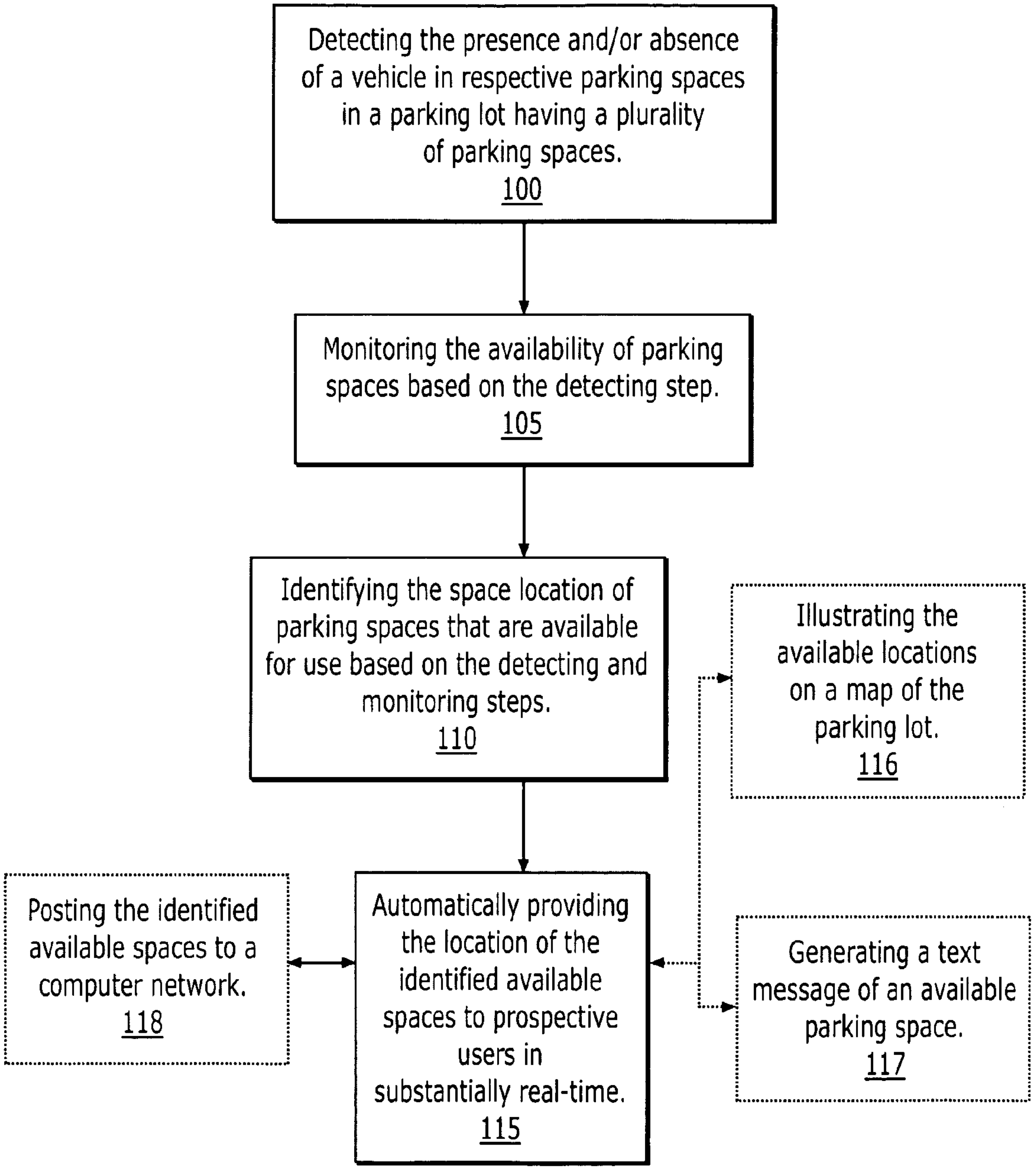
FIG. 1 is a flow chart of operations that can be carried out according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In the drawings, layers, regions, or components may be exaggerated for clarity. In the figures, broken lines indicate optional features unless described otherwise. The method steps are not limited to the order in which they are set forth.

Generally stated, embodiments of the present invention provide intelligent parking lot systems that can assess the availability and identify the location of the available individual parking spaces in a parking lot. The term "parking lot" includes any type of parking lots including open single level lots and/or multiple tier parking garages and can include a network of and/or discrete lots that are commonly managed or that participate in a common space allocation or inventory pooling system (such as parking lots disposed about a downtown area, a courthouse or about the premises of an airport). The present invention may be particularly suitable for large capacity parking lots that have a large number of individual pre-marked or delineated parking spaces for vehicles. The parking lot may be for cars, trucks, buses, vans, motorcycles, bicycles or any other type of motorized or non-motorized object capable of using a parking space. The term "object detector" is used interchangeably with the term "object sensor."

As will be appreciated by one of skill in the art, the present invention may be embodied as a system, method, data processing system, and/or computer program product. Accordingly, the present invention may take the form of an entirely hardware embodiment, an entirely software embodiment or an embodiment combining software and hardware aspects, which may all generally be referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as, but not limited to, Java®, Smalltalk or C++. However, the computer program code for carrying out operations of the present invention may also be written in conventional procedural programming languages, such as the "C" programming language. The program code may execute entirely on a computer associated with the parking lot system, as a stand-alone software package, partly on the parking lot system computer(s), partly on a user's computer and partly on a remote computer or entirely on the remote computer. In the latter scenario, the remote computer may be connected to the parking lot and/or user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

FIG. 1 illustrates operations that may be used to carry out embodiments of the present invention. As shown, the presence and/or absence of a vehicle in respective parking spaces in a parking lot can be detected (block 100). The availability of parking spaces can be monitored based on the detection (block 105). The space location of parking spaces available for use can be identified (block 110). The location of the identified available spaces can be automatically provided to prospective users based on substantially real time detection of the available spaces (block 115). The location of the identified spaces can be posted to a computer network (block 118). The available space locations can be identified by visually relaying an illustration of the locations on a map or grid of the parking lot (block 116) and/or by generating a text message of one or more available parking spaces to prospective parking lot customers (block 117). In addition, a sign or display can be positioned at the space(s) itself.

Figure 2:
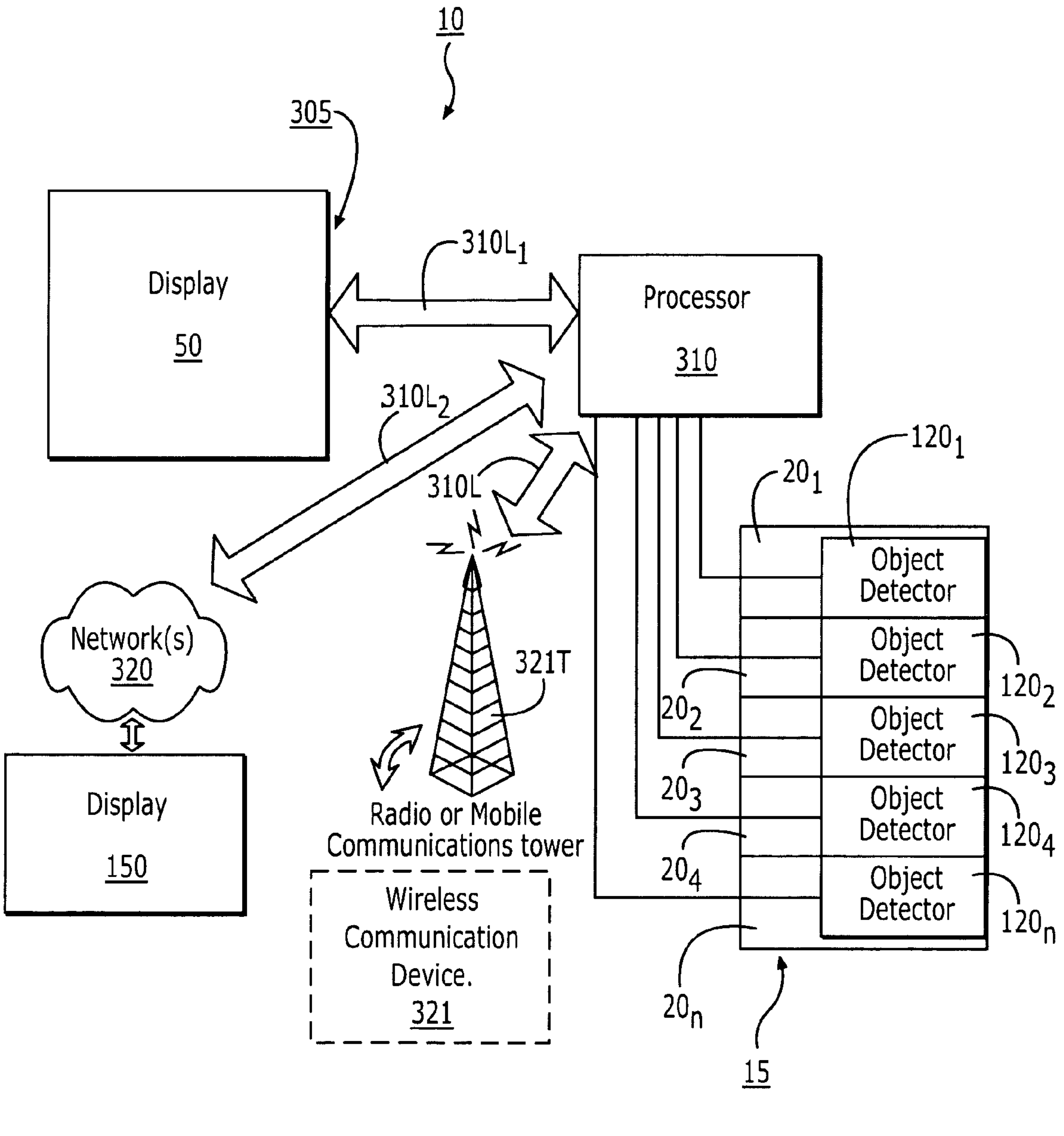
FIG. 2 is a schematic illustration of an intelligent parking system according to embodiments of the present invention.

FIG. 2 illustrates one embodiment of an intelligent parking lot system 10 according to the present invention. As shown, a parking lot 15 has a plurality of individual parking spaces 20, shown with reference to elements $\mathbf{20}_1$, $\mathbf{20}_2$, $\mathbf{20}_3$, $\mathbf{20}_4$ . . . $\mathbf{20}_n$. Each parking space 20 that is monitored for availability can have a corresponding object detector 120, shown with reference to elements $\mathbf{120}_1$, $\mathbf{120}_2$, $\mathbf{120}_3$, $\mathbf{120}_4$, $\mathbf{120}_n$. The system 10 also includes at least one processor 310 in communication with the object detectors 120. The processor 310 can be a plurality of distributed processors and/or may be configured as at least one controller. The processor 310 may be configured to communicate with the object detectors 120 in a wireless and/or wired manner. The processor 310 is configured to monitor the object detector data to identify available parking space locations and provide that information to prospective parking lot customers. The processor 310 includes at least one communication link 310L to an external output device that can provide the space information to a prospective parking lot user. As shown, the processor 310 includes three links, 310$L_1$, 310$L_2$, and 310$L_3$. The first link 310$L_1$ provides the information to a display 50, the second link 310$L_2$ provides the information to a computer network 320, and the third link 310$L_3$ provides the link to a communications tower 321T that, in turn, communicates with personal (portable or vehicle mounted) pervasive computing and/or communication devices 321. Fewer or greater links may be used.

The pervasive computing and/or communication devices 321 can be a personal computer whether a palm, laptop or vehicle-integrated computer and the like. Alternatively, the output device may be a pervasive computing device such as a smartphone, a two-way wireless communicator (such as the Blackberry™ wireless platform) or PDA.

The computer network 320 can be a local area network, a wide area network or a direct connection and may include an intranet (computers connected within a particular organization, company, coalition, or group), an extranet, a Virtual Private Network (VPN), a global computer network such as the Internet, including the World Wide Web, or other such mechanism for allowing a plurality of data processing systems with respective output displays 150 to communicate.

The communication link to the computer network 15 is illustrative of various suitable communications mechanisms that allow the processor 310 to communicate over a computer network. Such a communications link 310L may be provided, for example, by a network interface of a data processing system in communication with the processor 310. Typical network interfaces may include Ethernet, Token Ring or other such direct connections to a computer network provided, typically, by network interface card (NICs) or may be provided by, for example, a modem, including cable modems, Digital Subscriber Loop (DSL) modems, including ADSL an sDSL modems, wireless modems or conventional telephone modems which provides communications to a computer network.

Figure 3:
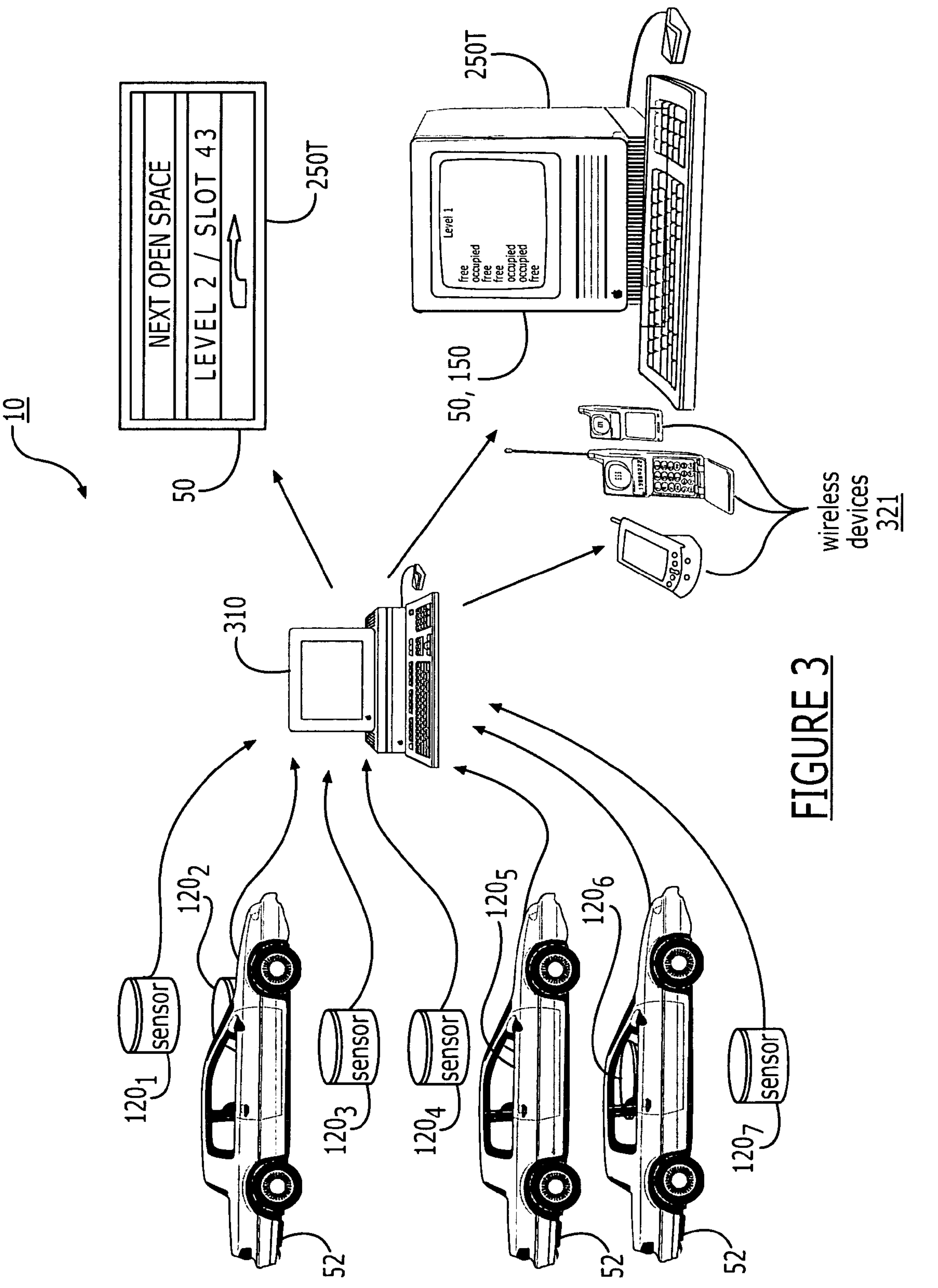
FIG. 3 is a schematic illustration of an additional embodiment of an intelligent parking system according to the present invention.
Figure 5A:
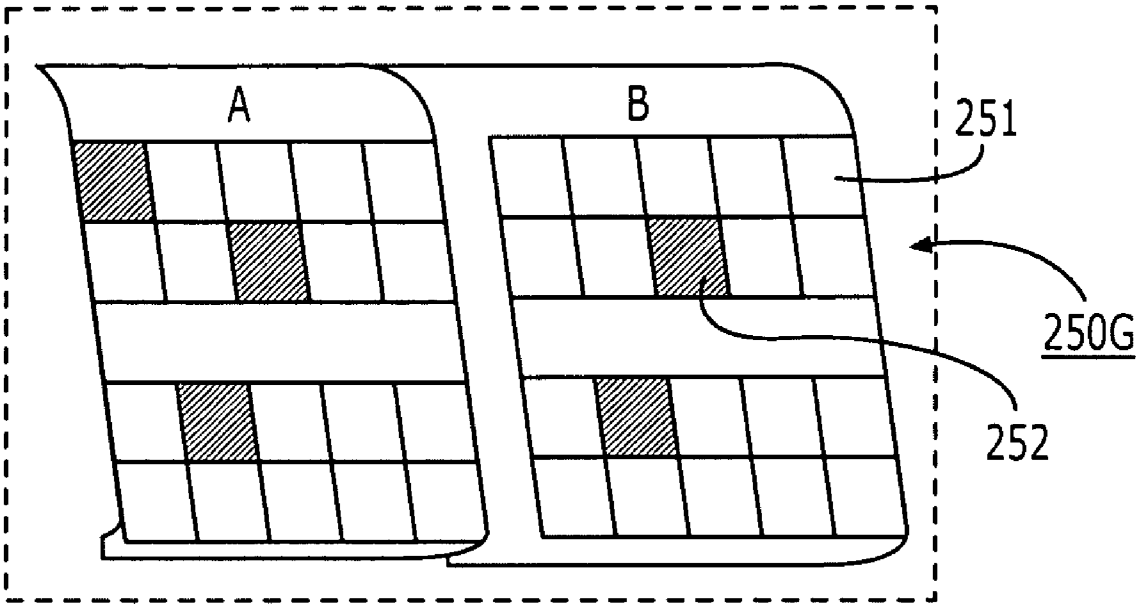
FIG. 5A is a display of a map of the locations of available parking spaces provided by embodiments of the present invention.
Figure 5B:
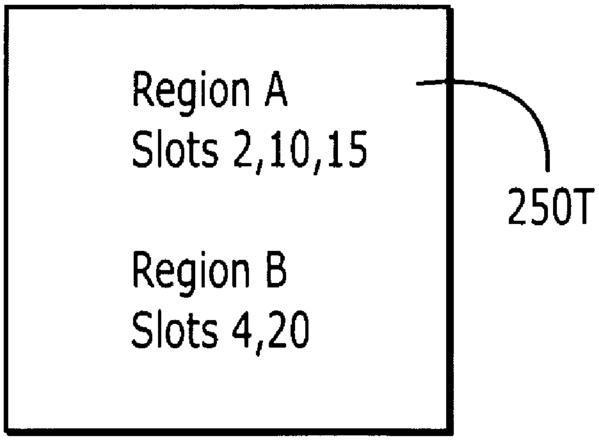
FIG. 5B is an output and/or display of the location of available parking spaces provided by embodiments of the present invention.

The information on the available parking spaces can be generated and displayed to one or more output devices 50, 150, 321 in a text and/or graphic format. For example, as shown in FIG. 5B, the identified available space or spaces can be presented textually 250T, such as by using an alpha/numeric indicator summarizing one or more available spaces to a prospective user. As shown, available slots or spaces are summarized in a spatially grouped manner, with the unoccupied slots or spaces available within a localized region or geographic partition of the lot being listed together. Other text formats can also be used, such as, "Region A, space 45" or "A45" and the output can provide the closest unoccupied slots first as a user enters the lot. FIG. 3 illustrates the data presented serially according to space per level and row.

Alternatively, the information can be provided in a visual grid or map of the parking lot to help a user spatially identify the location of the available space(s). The visual grid can be a fixed display with LED's or other lighting means used to indicate available spaces (not shown) that are operatively associated with the processor 310 for substantially real-time updating of the map (at least during high traffic periods as will be discussed further below). As shown in FIG. 5A, the output can be a computer generated graphic 250G of a region or regions in the lot that visually contrast the available positions 251 with unavailable positions 252. For example, the visual graphic presentation can provide a floor diagram and highlight and/or visually enhance unoccupied spaces. The occupied spaces can be identified with color, such as red or black with different colors, such as green or white for unoccupied. Of course other colors and/or gray tones with visual contrast formatting can also be used. Alternatively, the output can be arrows positioned on displays to direct a prospective user to an unoccupied and/or available space. In any event, the identity of the available parking space(s) can be provided to one or more external large signage (typically fixed position) displays 50 located proximate to and/or in the parking lot such as at entrances and/or access roads to the lot as well as at regional positions within the parking lot.

The available space location data can be audibly provided using an automated voice translation system that converts digital space data to a verbal message that can be transmitted over predetermined broadcast systems such as radiochannel(s) thereby directing the driver of a vehicle to a lot and/or open space as they arrive in the vicinity of the parking lot.

The system 10 can also be configured to generate aggregate data of the number of spaces available. In addition, in certain embodiments, the system is configured to allocate a first parking space to a first vehicle on a first time entry into the parking lot, and then allocate a second parking space to a second vehicle that enters the parking lot thereafter and identify this information or assign the spaces in substantially real time as the driver enters or proceeds through the parking lot.

The system 10 can be configured to display a selected parking region having a cluster of open regions in a graphic format proximate a parking lot entry site and textually display parking lot locations for more isolated available spaces.

The system 10 can also be configured to exclude parking spaces from the spaces identified as available for those spaces that are under repair or blocked from available parking (such as for safety reasons) as being unavailable even though an object may not be positioned/parked therein. In particular embodiments, the system 10 can virtually reserve parking spaces based on pre-orders of users that specify date and time of parking lot space anticipated, and then identifying to the user the parking space so reserved.

In particular embodiments, the unoccupied space(s) can be sent via text or voice message to a wireless communication device. The message can include navigational instructions to help guide a prospective parking lot customer to a particular space. For example, the instructions may state that G165 is available and to park there one can "proceed to entrance 1, turn left, go straight past two rows, turn left and enter the G sector. Space 165 is midway between the two aisles on the left as you approach this location."

The unoccupied or available space data may be provided by vehicle-integrated components such as internal navigation systems, Onstar® systems, and even broadcast over a selected (typically AM) radiochannel.

FIG. 3 illustrates one embodiment of the intelligent parking lot system 10. As shown, in operation, the detector 120 can be configured to detect when a space is occupied by a vehicle 52 and relay this data to the processor 310. Alternatively, the detector 120 can be configured to detect when a space is unoccupied. Each parking space can have its own one or more detectors, or the space may share one or more detectors with one or more neighboring spaces. In the embodiment shown, the detectors 120 can be wired to a power source and/or the controller 310. Each detector 120 can include a unique port address or other address identifier means that correlates it to its physical location in the parking lot. The system 10 may have a computer correlation program that matches detectors 20 with assigned locations or the detectors 20 may have encoded identifier data that the processor 310 can use to identify from where the detected data is from.

Figure 4:
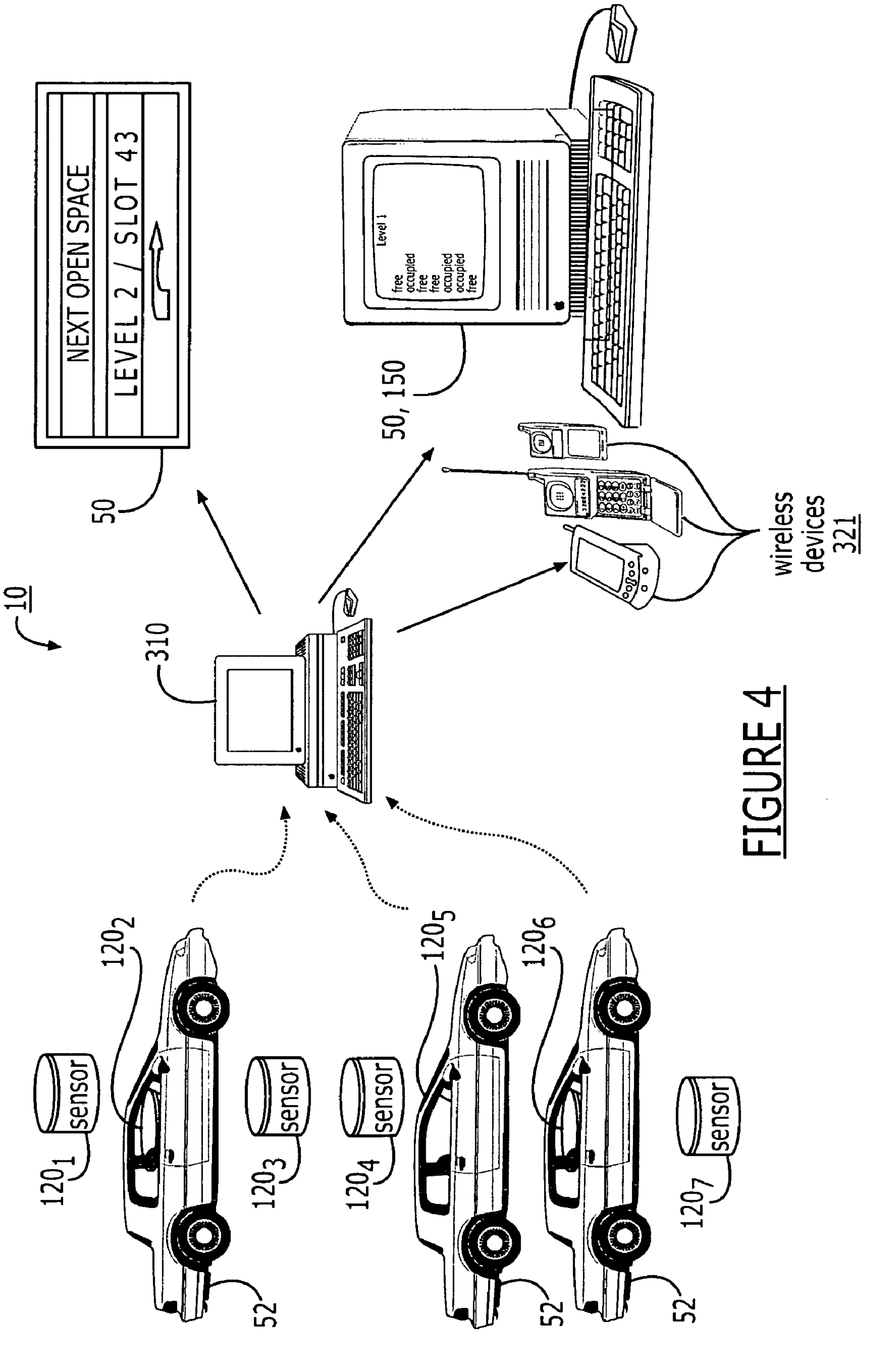
FIG. 4 is a schematic illustration of yet another embodiment of an intelligent parking system according to the present invention.

FIG. 4 illustrates that the detectors 120 can be configured to wirelessly communicate with the processor 310. In this embodiment, the data from the detectors 120 can be bit encoded for identification purposes. The detectors 120 may be configured to operate using battery power and may be rechargeable and optionally include a solar or photocell recharger. For battery-powered embodiments, the detectors 120 may be configured to operate to have an extended battery life of at least about three months to allow for reduced maintenance requirements. A low-battery signal can be relayed to the controller 310 to allow for preventative just-in-time maintenance protocols.

Examples of object detectors 120 may include, but are not limited to, magnetic proximity sensors, photoelectric switches such as photoelectric proximity or reflex switches (which may use emitter/reflector configurations), optical sensors such as brightness detectors, light grids, infrared switches, inductive proximity switches, capacitive proximity switches, ultrasonic sensors and the like. Examples of commercially available position or proximity sensors are described at URL sick.de/de/products/categories/industrial. In other embodiments (or in addition thereto), the object detector 120 can include a camera that obtains digital images that can be digitally analyzed to determine whether a space or spaces is empty.

In certain embodiments, the detectors 120 can include an RFID (radiofrequency identification) circuit as well as one or more of the active sensing elements. The object detectors 120 may be configured as compact or microsensors with integrated sensing, processing, and communications to yield a low-power smart networked-enabled wireless detector 120 with extended battery life of greater than three months. See, e.g., Control Engineering, *APP introduces world's first wireless proximity sensor*, May 15, 2002 and *Sensor Technology and Design, MICA The Commercialization of Microsensor Motes*, April 2002, url sensormag.com/articles/0402/40,main.shtml, the contents of these references are incorporated by reference as if recited in full herein. Combinations of the object sensors can also be used.

At least one detector 120 is positioned in proximity to a respective parking space. When no vehicle is present in the parking space the detector 120 can be configured to send no signal to the processor 310. When the detector 120 detects the presence of a vehicle, it sends a signal that is correlated to its location. The processor 310 analyzes the signal data and outputs the location of the available parking spaces. The output can be directed to a display sign(s) or board(s) proximate the parking lot. Typically, the display boards or signs are mounted at entrances, major parking sections or partitions, including each floor or tier, as well as provided to a web page and/or sent to a wireless personal device as noted above.

In certain embodiments, the processor 310 can provide information about the occupied and/or unoccupied or available spaces as web pages that may be predefined and stored at a local device. Such web pages may also be dynamically generated to incorporate substantially real-time parking data. The web pages may be Hypertext Markup Language (HTML) common gateway interface (CGI) web pages. The web pages may also be or include Java scripts, Java applets or the like which may execute at the processor 310. As will be appreciated by those of skill in the art, other mechanisms for communicating between a web server and a client may also be utilized. For example, other markup languages, such as Wireless Markup Language (WML) or the like, for communicating between the local processor and the prospective parking lot user using an output display 50, 150, 321 may be used.

In certain embodiments, the system 10 can be configured so that the detectors 120 may be selectively activated during peak parking periods and deactivated, placed on stand-by or watchdog mode or be unpolled during lesser traffic periods to reduce power consumption. That is, the monitoring may be implemented at desired polling periods that activate only when the lot aggregate number indicates that the parking lot has reached a predetermined threshold such as about 20%, and typically at least about 30% or more, of capacity.

In certain particular embodiments, a respective detector 120 can be configured to be powered or at full power only at certain times. For example, the detector 120 can be deactivated or put in a sleep or standby mode for a desired interval from the time that the detector 120 first detects a vehicle is parked therein. For example, in an hourly lot, the detector 120 in an occupied space may be deactivated or its power placed in sleep or standby mode for at least 15 minutes after the detector first determines the space to be occupied. For longer term parking, the detectors 120 can be programmed to go into standby or disconnect power for at least one hour, typically 2–4 hours, and more typically 4–6 hours, from the time a vehicle is determined to be parked in the space, and then reactivated at desired time periods to confirm that the space is still occupied. The detector 120 may be selectively powered to operate once per hour after the first 2–4 hour period for a certain interval and then decremented to a certain number of minutes. In other embodiments, the detector 120 may be configured to substantially continuously monitor the status of the parking space.

In certain embodiments, the detector 120 can be configured to provide a signal only when a vehicle is present and send no signal when unoccupied. In other embodiments, the detector 120 can operate in the reverse by sending a signal only when unoccupied. This may be particularly appropriate when the system is not activated until the lot is above a certain level. In particular embodiments, the system 10 can be configured to send a signal only when occupied when the lot is under a certain capacity threshold (with more spaces empty than occupied) and then operate in the reverse and send a signal only when the space is unoccupied when the lot is above a certain threshold (with more spaces occupied than not).

Figure 6:
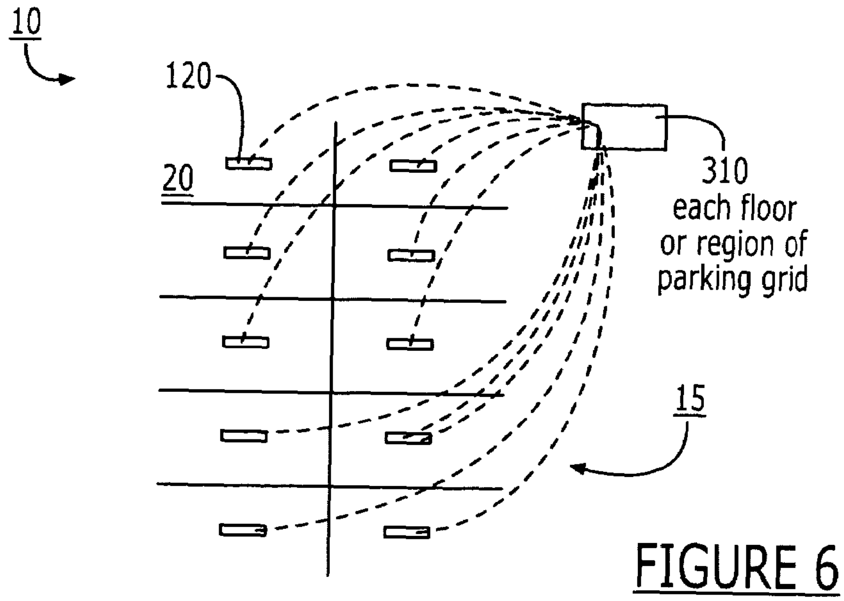
FIG. 6 is a schematic illustration of a portion of a parking lot having at least one object sensor/detector at each parking space according to embodiments of the present invention.
Figure 7A:
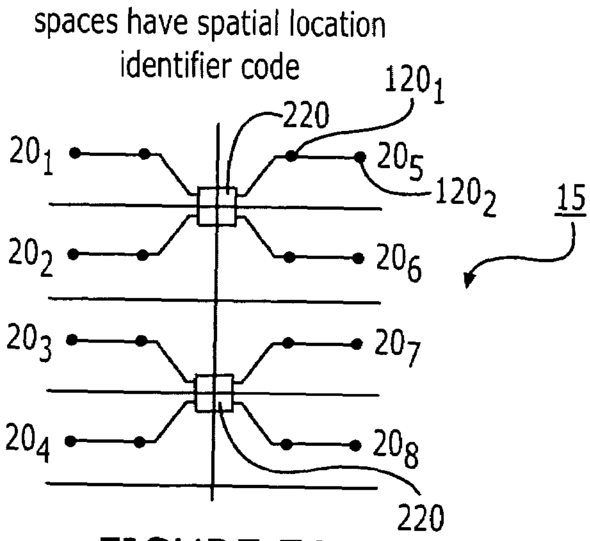
FIG. 7A is a schematic illustration of a portion of a parking lot having a plurality of serially connected sensors/detectors for each parking space according to embodiments of the present invention.
Figure 7B:
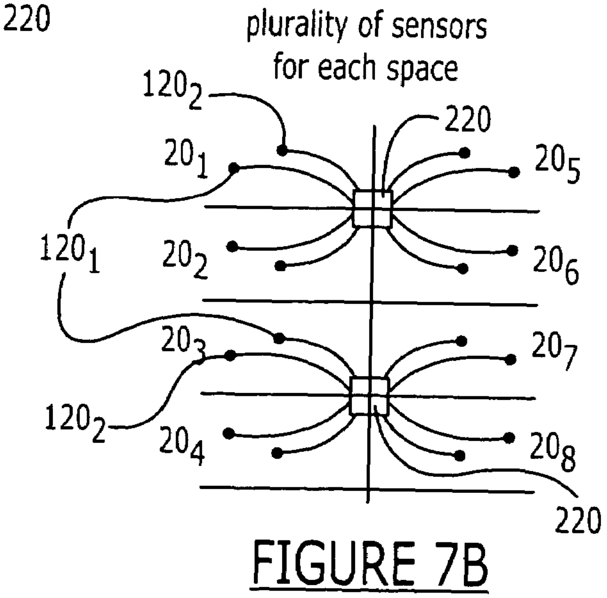
FIG. 7B is a schematic illustration of a portion of a parking lot having a plurality of sensors/detectors for each parking space according to yet other embodiments of the present invention.

FIG. 6 illustrates that a single detector 120 may be positioned on the floor of a respective parking space 20 in a parking lot 15 and communicate with the processor 310. The detector 120 may be configured to reside in the center of space or to the side. FIG. 7A illustrates that a plurality of detectors 120 may be positioned with a parking space 20. As shown, two detectors in series 1201, 1202 can be placed in the space 20. As shown, the system 10 may include a plurality of sub-relay stations 220 that communicate with a plurality of detectors 120. The sub-relay station 220 then communicates with the processor 310. The substation can be used to power or transmit data and may be employed with any the embodiments described herein. The sub-relay station 220 can be wired to the respective detectors 120 or operate in a wireless communication mode as described above for other embodiments. Similarly, the sub-relay station 220 can be wired to the processor 310 or operate in a wireless mode. As shown, the sub-station 220 can be positioned adjacent a position that allows communication with four spaces. Other configurations and numbers of detectors in communication with the sub-relay station can also be used. FIG. 7B illustrates that the system 10 can employ a plurality of detectors $\mathbf{120}_1$, $\mathbf{120}_2$ per space 20 in a lot 15.

Figure 8:
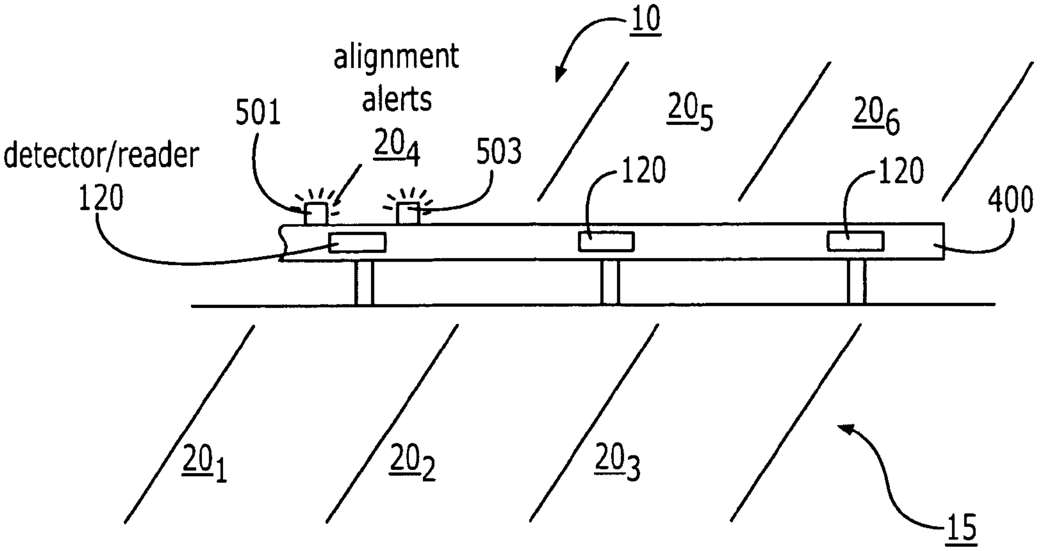
FIG. 8 is a schematic front view of a portion of a parking lot with a parking rail holding object sensor/detectors for respective parking places according to embodiments of the present invention.

FIG. 8 illustrates that the detectors 120 may be placed on a rail 400 that extends centrally between adjacent spaces 20 (between front to front parked vehicle position). The rail 400 can hold a detector 120 for the two adjacent spaces, one on each side of the rail 400. The rail 400 can also hold supplemental components such as a proximity alignment alert device 501 to visually indicate when the user is in proper alignment and/or an emergency alert 503 (alarm and/or call device) which can be activated when a customer needs assistance. The emergency alert 503 can be positioned at each space or at selected locations. The emergency alert 503 can be in communication with the processor (directly or through a substation) to automatically identify the location of the triggered alert. The rail 400 may be configured so that the sensor is positioned at least at a standard bumper height, although other configurations can also be used.

In certain embodiments, one or more object detectors 120 can be mounted on a pole or rod located above the parking floor (typically above the height of the vehicles) that can obtain periodically obtain or take a photograph or image of the parking space(s). The system 10 can then analyze the digital image to determine whether a space is occupied or empty.

It is noted that the detector 120 may be positioned at any suitable location in communication with a parking space 20 so as to be able to detect when the space is either and/or both occupied and/or unoccupied by an object. For example, the detectors 120 may be mounted to existing structures (walls, ceilings, curbs) in a lot 15 or to added structures as suitable.

Figure 9:
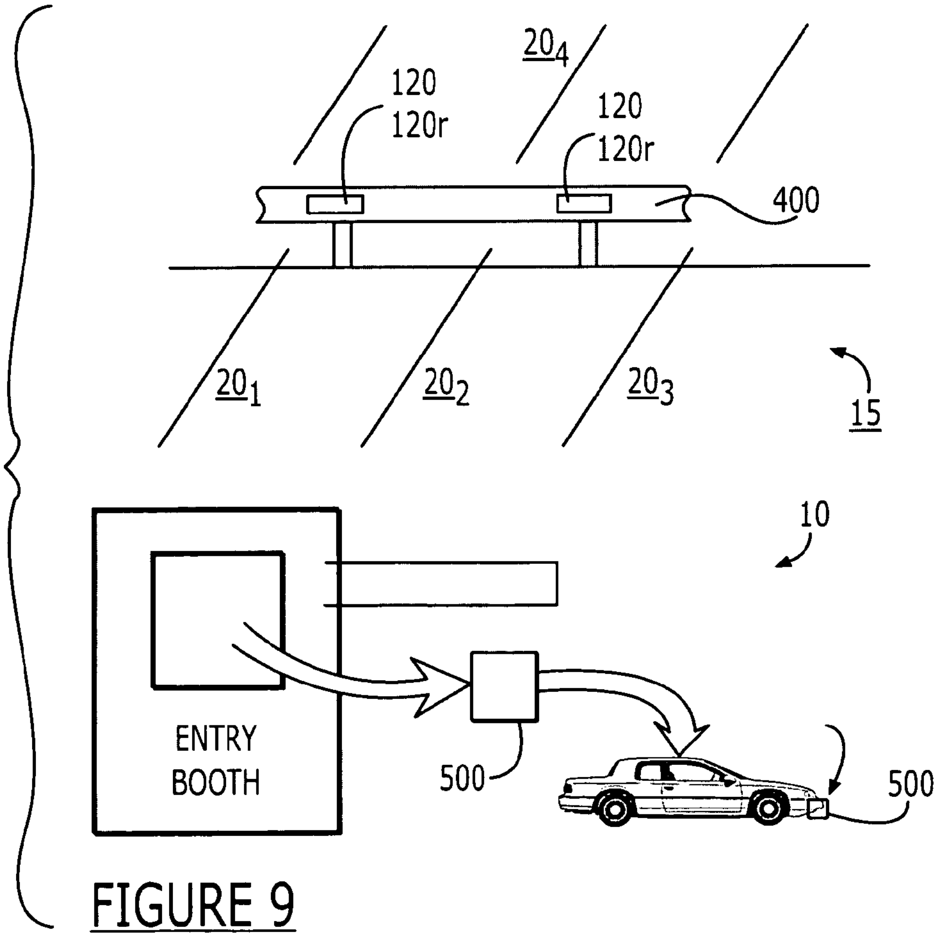
FIG. 9 is a schematic illustration of a parking system having parking passes/tags that can be dispersed for each vehicle and read at respective parking places according to yet additional embodiments of the present invention.

In certain embodiments, as shown in FIG. 9, the system 10 can be configured to issue a pass or tag 500 for each vehicle that is placed in a predetermined region on a respective vehicle so as to be able to be read by a reader at the parking space. The tag 500 can be issued at the entrance to the lot 15 or pre-ordered. The tag 500 can be correlated to user-specific data that is entered for a tag identifier in a computer. The user-specific data can include a vehicle type, license plate number and may even include a driver name. The tag 500 can be a bar code or RFID tag that can be automatically read by a reader 120*r* at a parking space positioned proximate the space where the user's vehicle 52 is parked in the parking lot 15. The detector 120 has a unique space identifier and the parking system 10 receives the space location and the user information from the tag 500 at the parking space 20 so that it can determine where the user is parked. If the user forgets where he/she is parked (upon his or her return), entering tracked data such as one or more of the license plate, name or tag number into the parking system 10 can allow the vehicle 52 to be conveniently physically located. The reader 120*r* may be incorporated into the detector 120 or may be a separate component. The reader 120*r* may be configured to automatically read the tag 500 if the tag 500 is positioned in the appropriate region on the vehicle such as a door, tire cap, window, etc . . . (shown as the front bumper). In certain embodiments, the tag 500 can be magnetic or include an adhesive or otherwise configured to attach to the vehicle.

In particular embodiments, the user-specific data may also indicate a target exit time for space planning. The system may be configured to place "holds" on open spaces using a reservation indicator at a particular space based on pre-orders for spaces. The hold does not have to be for a permanent space but can be based on a statistical probability of what space will be open when the order time frame needs the space allowing increased lot space utilization over dedicated "reserved" spaces.

In certain embodiments, the exit to the parking lot 10 can include an anti-theft review. That is, the exit can also include a reader that reads the tag 500 and the exit attendant can review the driver's license to see if it matches the data in the computer.

Figure 10:
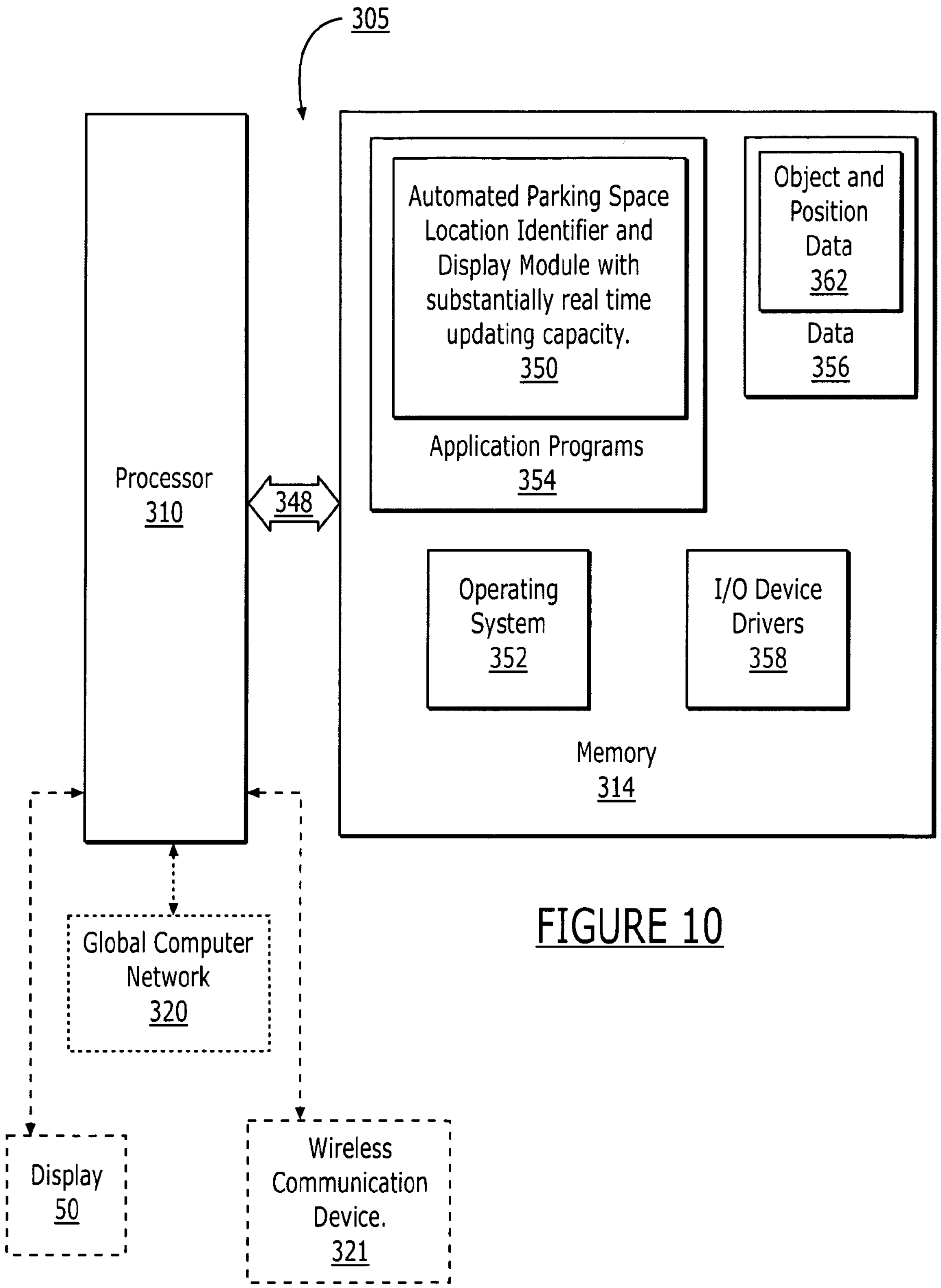
FIG. 10 is a schematic illustration of an operating system according to embodiments of the present invention.

FIG. 10 is a block diagram of exemplary embodiments of data processing systems that illustrates systems, methods, and computer program products in accordance with embodiments of the present invention. The processor 310 communicates with the memory 314 via an address/data bus 348. The processor 310 can be any commercially available or custom microprocessor. The memory 314 is representative of the overall hierarchy of memory devices containing the software and data used to implement the functionality of the data processing system 305. The memory 314 can include, but is not limited to, the following types of devices: cache, ROM, PROM, EPROM, EEPROM, flash memory, SRAM, and DRAM.

As shown in FIG. 10, the memory 314 may include several categories of software and data used in the data processing system 305: the operating system 352; the application programs 354; the input/output (I/O) device drivers 358; an automated parking space location identifier and output display module with substantially real-time updating capacity 350; and data 356.

The data 356 may include object location (occupied and/or unoccupied space position) data 362 which may be obtained directly or indirectly from the respective detectors 120. As will be appreciated by those of skill in the art, the operating system 352 may be any operating system suitable for use with a data processing system, such as OS/2, AIX or OS/390 from International Business Machines Corporation, Armonk, N.Y., WindowsXP, WindowsCE, WindowsNT, Windows95, Windows98 or Windows2000 from Microsoft Corporation, Redmond, Wash., PalmOS from Palm, Inc., MacOS from Apple Computer, UNIX, FreeBSD, or Linux, proprietary operating systems or dedicated operating systems, for example, for embedded data processing systems.

The I/O device drivers 358 typically include software routines accessed through the operating system 352 by the application programs 354 to communicate with devices such as I/O data port(s), data storage 356 and certain memory 314 components and/or the image acquisition system 320. The application programs 354 are illustrative of the programs that implement the various features of the data processing system 305 and preferably include at least one application that supports operations according to embodiments of the present invention. Finally, the data 356 represents the static and dynamic data used by the application programs 354, the operating system 352, the I/O device drivers 358, and other software programs that may reside in the memory 314.

While the present invention is illustrated, for example, with reference to the Automated Space Location Module 350 being an application program in FIG. 10, as will be appreciated by those of skill in the art, other configurations may also be utilized while still benefiting from the teachings of the present invention. For example, the Module 350 may also be incorporated into the operating system 352, the I/O device drivers 358 or other such logical division of the data processing system 305. Thus, the present invention should not be construed as limited to the configuration of FIG. 10, which is intended to encompass any configuration capable of carrying out the operations described herein.

The I/O data port can be used to transfer information between the data processing system 305 and the global computer system 320 (e.g., the Internet) or another computer system or other device controlled by the processor. These components may be conventional components such as those used in many conventional data processing systems, which may be configured in accordance with the present invention to operate as described herein.

In the drawings and specification, there have been disclosed embodiments of the invention and, although specific terms are employed, they are used in a generic and descriptive sense only and not for purposes of limitation, the scope of the invention being set forth in the following claims. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A system of directing parking in a parking lot, comprising:

means for electronically detecting the presence and/or absence of a vehicle in a respective parking space in a parking lot having a plurality of parking spaces to monitor for the availability of parking spaces;

means for identifying the space location of parking spaces that are available for use based on the detecting;

means for automatically updating and providing the location of the identified available spaces to at least one output device accessible by a prospective parking lot customer in substantially real-time; and means for electronically correlating a particular user to a particular parking location using a virtually reserved parking space identified based on a statistical probability of a parking space availability at a desired parking time.

2. A parking system according to claim 1, wherein the means for correlating comprises at least one reader in communication with a processor configured to automatically electronically obtain data in situ from a parking pass mounted to a respective vehicle as a user parks in a space that identifies a user in a respective parking space for each non-assigned parking space available to the general public, and wherein the system is configured to use the user identifier data to correlate the parking space location with a specific user in that parking space.

3. A parking system according to claim 1, wherein the means for detecting comprises at least one detector that is mounted to a floor of the parking space.

4. A parking system according to claim 1, wherein the means for detecting comprises at least one detector that is attached to an upstanding rail that is positioned to extend across a forward portion of a respective parking space.

5. A parking system according to claim 1, wherein the means for correlating comprises an electronic reader is configured to electronically automatically obtain data associated with a user and/or vehicle in a respective parking space without any manual input action by a user in the parking space, the data corresponding to at least one of a user's name, driver's license number and/or license plate number.

6. A parking system according to claim 1, wherein the means for detecting comprises at least one object detector configured to identify when an object occupies a respective parking space and/or when the respective parking space is unoccupied;

wherein the means for identifying comprises at least one processor in communication with the at least one object detector, the at least one processor being configured to automatically identify the location of individual parking spaces that are available and/or the parking spaces that are unavailable to a parking lot patron or potential user based on data obtained from the at least one object detector; and wherein the means for identifying and the means for updating and providing include at least one processor in communication with an exterior display sign output device that graphically displays a map illustrating a cluster of available spaces in graphic format of parking spaces in the parking lot and visually contrasts the available spaces from the spaces that are unavailable, wherein the processor is configured to generate a textual summary of locations of isolated available spaces to prospective users, and wherein the processor is configured to communicate with a plurality of individual wireless devices with displays to provide parking patrons and potential patrons the map of the cluster of available and unavailable spaces and the textual summary of locations of isolated spaces that is updated in substantially real time.

7. A parking system according to claim 1, wherein the system identifies the locations of the available spaces in substantially real-time, wherein the system is configured to allocate a first available parking space to a first vehicle at a first time entry into the parking lot, then allocate a second different parking space to a second vehicle at a subsequent second time, and update the map and textual summary to exclude the allocated spaces even when the first or second vehicle has not yet parked in the respective allocated space.

8. A parking system according to claim 1, wherein the means for identifying and the means for updating and providing comprise at least one processor that is configured to relay the location of available and/or unavailable parking spaces to prospective users over a computer network, wherein the system is configured to generate auditory navigational instructions to a parking lot patron via an associated wireless device to guide the respective patrons to an open space or a cluster of open spaces.

9. A parking system according to claim 8, wherein the computer network is a global computer network.

10. A parking system according to claim 1, wherein the means for updating and providing comprises at least one processor that is configured to communicate with a plurality of wireless devices to transmit text messages electronically notifying respective parking lot patrons of available spaces.

11. A parking system according to claim 6, wherein the display sign is sized and configured to reside proximate the parking lot for viewing by drivers approaching and/or in the parking lot.

12. A parking system according to claim 6, wherein the processor is configured to graphically display the map of parking spaces in the parking lot and visually contrast the available spaces from the spaces that are unavailable on the displayed map on the exterior display and the wireless communication device displays, said system further configured to relay the visually contrasted map of available spaces to a web page.

13. A parking system according to claim 1, wherein the means for updating and providing comprises at least one processor configured to generate navigation instructions that can be output as auditory instructions transmitted to a user via a wireless device of the user to guide a user in the parking lot to an available space.

14. A parking system according to claim 1, wherein the means for identifying is configured to assign and/or automatically allocate a first parking space to a first vehicle on a first time entry into the parking lot, then assign and/or allocate a second parking space to a second vehicle that enters the parking lot thereafter.

15. A parking system according to claim 1, wherein the means for identifying and/or means for correlating comprises at least one processor configured to virtually reserve parking spaces using a web page accessible via the Internet based on pre-orders to users that specify a date and time a parking lot space is desired, then identify to the users the parking spaces so reserved.

16. A parking system according to claim 1, wherein the means for correlating comprises a reader configured to electronically automatically obtain user identifier data from a parking pass to electronically identify a user's parking location to that user after a user has parked to thereby allow a user to find his or her car if that user subsequently forgets where his or her parking space is located.

17. A parking system according to claim 16, wherein the means for correlating comprises at least one processor that is configured to generate a unique identifier associated with a parking pass, and wherein the reader is configured to electronically read the parking pass that is assigned to a particular user after the respective user enters or parks in a parking space without requiring physical action on the part of the user in the parking space to initiate the reading.

18. A system according to claim 17, wherein the reader is configured to automatically read the parking pass from at least one predefined position on the vehicle when the user is in a parking space to provide user-specific data, and wherein the system is configured to automatically correlate a specific user to the location of the parking space based on the user-specific data and the location of the parking space where the specific user has parked.

19. A system according to claim 1, wherein the means for correlating is configured with anti-theft control means that employs user-specific data to confirm that a vehicle exiting or leaving the parking lot has an authorized driver.

20. A system according to claim 1, wherein the means for correlating is configured with anti-theft control means that employs user-specific data to confirm that a vehicle has a proper license plate before the vehicle is allowed to exit the parking lot.

* * * * *